Figure 1:
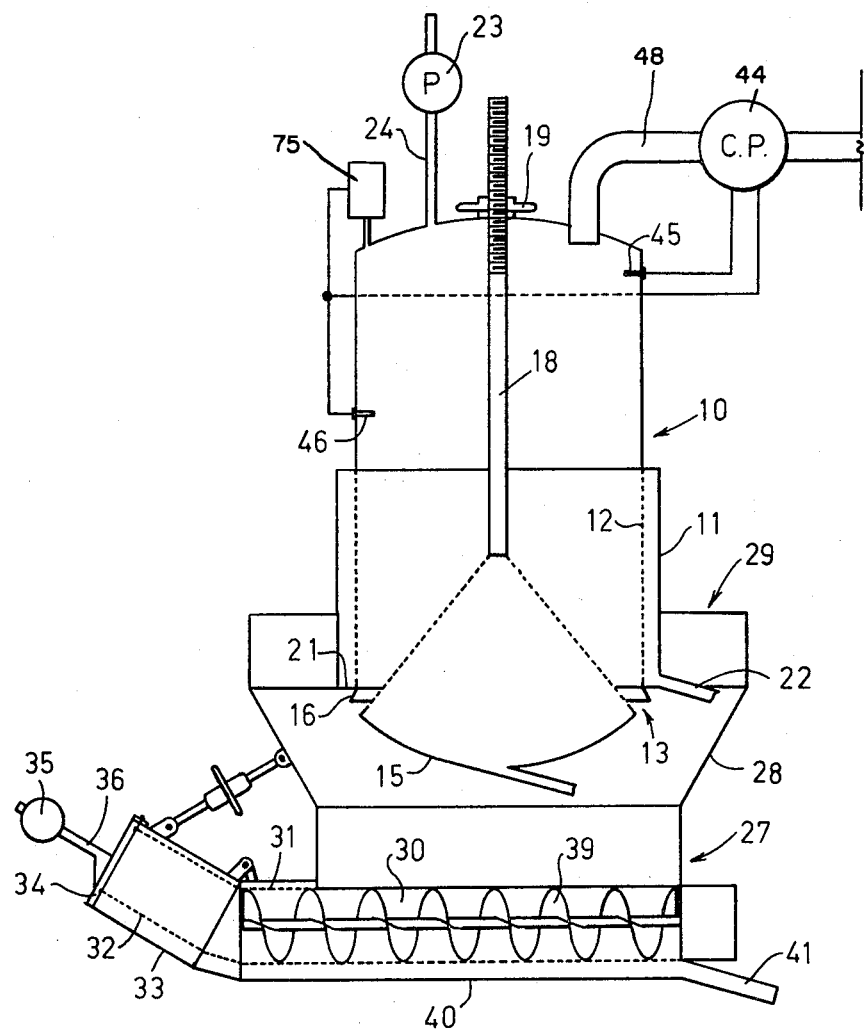

United States Patent [19]
Mackenzie

[11] 3,715,977
[45] Feb. 13, 1973

[54] JUICE EXTRACTING DEVICE

[75] Inventor: John Mackenzie, Adelaide, Australia

[73] Assignee: Jack Sinclair, Adelaide, South Australia, Australia, part interest

[22] Filed: Dec. 1, 1970

[21] Appl. No.: 94,001

[52] U.S. Cl. .............................. 100/117, 100/147
[51] Int. Cl. ............................................ B30b 9/14
[58] Field of Search .....100/117, 104, 126, 127, 98 R

[56] References Cited

UNITED STATES PATENTS 3,111,082   11/1963   Larsson et al. ................... 100/117 X

FOREIGN PATENTS OR APPLICATIONS 1,200,968   12/1959   France .............................. 100/117
81,895    9/1934   Sweden ............................. 100/98 R

*Primary Examiner*—Edward L. Roberts
*Attorney*—Carl R. Brown

[57] ABSTRACT

A device for extracting fruit juice from crushed fruit wherein the epidermal cells of the crushed fruit are driven through a perforate conduit and have pressure applied to them to express juice from them, the device comprising a primary extraction container, a secondary extraction container having an auger with drive means coupled thereto, a perforate member beneath the auger, a perforate conduit constituting an extension of the perforate member, imperforate juice collecting means beneath both the perforate member and perforate conduit, and a discharge opening in the perforate conduit, the discharge opening containing restriction means so that pressure is built up on the epidermal cells by driving of the auger, the perforate conduit varying in direction so that the epidermal cells when being driven there-through have pressure reduced on them and then reapplied.

5 Claims, 5 Drawing Figures

JUICE EXTRACTING DEVICE

This invention relates to a juice extracting device which is suitable for extracting the juice of grapes, but in some circumstances can be used for extracting the juice from other fruit.

Previously proposed juice extractors have utilized gravity drainage, pressure drainage wherein gas at pressure is applied to crushed grapes in a container, pressure drainage wherein the crushed grapes are forced outwardly against a sieve by pressure imparted by an inflatable bag, and in some cases, an auger which transports the crushed grapes over a sieve.

With previously proposed devices it has been considered desirable to extract the maximum amount of juice from crushed fruit, and this has usually carried with it the disability that some of the juice contains a large amount of suspended solid matter (lees) and the juice which contains this solid matter is suitable for second grade wines only. If filtration is resorted to remove the solid suspended matter, then there is some loss of juice, and for example, by employing the known type of juice extracting devices it is considered that portion only (usually less than half) of the total grape juice extracted from crushed grapes is suitable for premium grade wine. The loss to a winery due to much of the juice being suitable only for wines other than premium grade is very considerable, and one of the objects of this invention is to provide improvements whereby the quality of the grape juice will be superior and the juice will be cleaner than with certain other types of known juice extracting devices. In one of the forms of filtration previously employed, the juice has been allowed to pass through grape skins, but even if the skins are subjected to pressure, they still retain much of the juice which is then lost to the wine maker. A further object of this invention is to provide means whereby juice is more readily released from crushed epidermal cells.

In this invention a device for extracting juice includes a frame, an auger journalled in the frame, drive means coupled to the auger, a perforate member beneath the auger, a perforate conduit constituting an extension of the perforate member, imperforate juice collecting means beneath both the perforate member and the perforate conduit, a discharge opening in the perforate conduit, flow restriction means in the discharge opening, the perforate conduit varying in at least one of the following, namely cross-sectional area and direction, so constructed and arranged as to firstly reduce and then re-apply pressure on the epidermal cells when they are driven through the perforate conduit.

The process of the invention may include the steps:
a. crushing the fruit,
b. passing the crushed fruit into a perforate member,
c. subjecting the crushed fruit to pressure so as to express juice from the epidermal cells thereof as the fruit traverses a perforate conduit whereby at least some of the juice filters through the epidermal cells and passes through the perforate wall to the collecting means,
d. reducing pressure on the epidermal cells while still in the perforate conduit, and
e. driving the epidermal cells past the flow restriction means and through the discharge opening to thereby recompress the cells.

The process is not limited to extraction of juice from grapes, but other fruits can be used still taking advantage of this feature of the process.

By incorporating a change in direction of the perforate conduit, or in the alternative, a change in cross-sectional area, it becomes possible to temporarily release pressure on the epidermal cells. This is found to provide the unexpected result that some of the juice entrapped in the epidermal cells when subjected to pressure is released and the re-application of pressure to the cells releases still further quantities of juice, and for these reasons this invention provides, not merely a higher proportion of juice suitable for premium grade wines, but also a higher yield.

Most of the previously proposed juice extracting devices have utilized a batch process wherein the crushed fruit is processed, the juice extracted, the device cleared and a further batch introduced. This usually involves as a necessary adjunct the exposure of the juice to the air, and degradation due to oxidation can take place. Furthermore the process is slow because of the down time between batches. Thus in the case of a large winery it is necessary to have a number of devices or else a large device for the extraction of juice.

One of the further objects of this invention is to provide improvements whereby a juice extracting device can be of the continuous operation type, and avoid the down time which is encountered with the batch type of device. A still further object is to provide a device which can be used in an atmosphere other than an oxygen rich atmosphere thereby avoiding degradation of the grape juice through oxidation.

To achieve these further objects this invention may although not necessarily include among its further features a device provided with a pump, a container, and closure means in the container which are controllable to retain crushed fruit therein when the fruit is pumped into the container by the pump, but to open to thereby form a container discharge opening, as the crushed fruit is subjected to pressure.

When a juice extracting process is to be continuous, quite clearly both the juice and the solids must be capable of separation either continuously or else at spaced intervals during the process, and therefore one of the objects of this invention is to provide a means which will make it possible to remove the solids from an extraction container without necessarily releasing the pressure imposed on the crushed fruit in the container. Since separation essentially involves passage of the solids past a permeable wall and of the liquids through that wall, it becomes desirable for the solids to be contained within the wall but to occupy most of the space defined by the wall, and to meet this problem this invention may include as a further feature means to urge the closure means towards a closed position at the discharge end of the perforate wall, but to allow the closure means to open as pressure applied to the crushed fruit increases. The closure means can for example be in the form of a hinged door counterweighted against the pressure, or could for example be in the form of a spring loaded plug on an end of an auger casing containing the auger arranged to control the flow of the semi-solid mass being discharged from the separation container.

Figure 2:
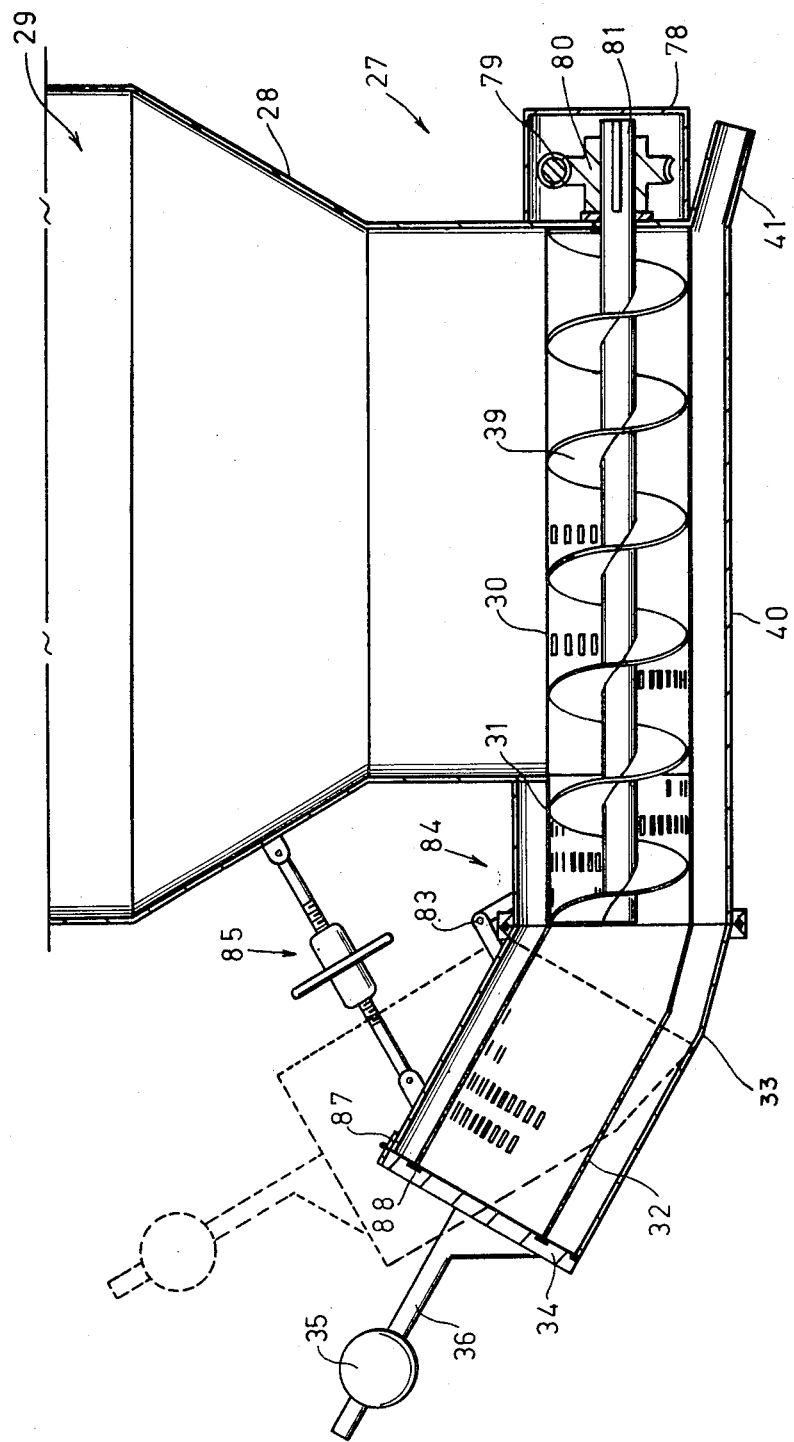
Figure 3:
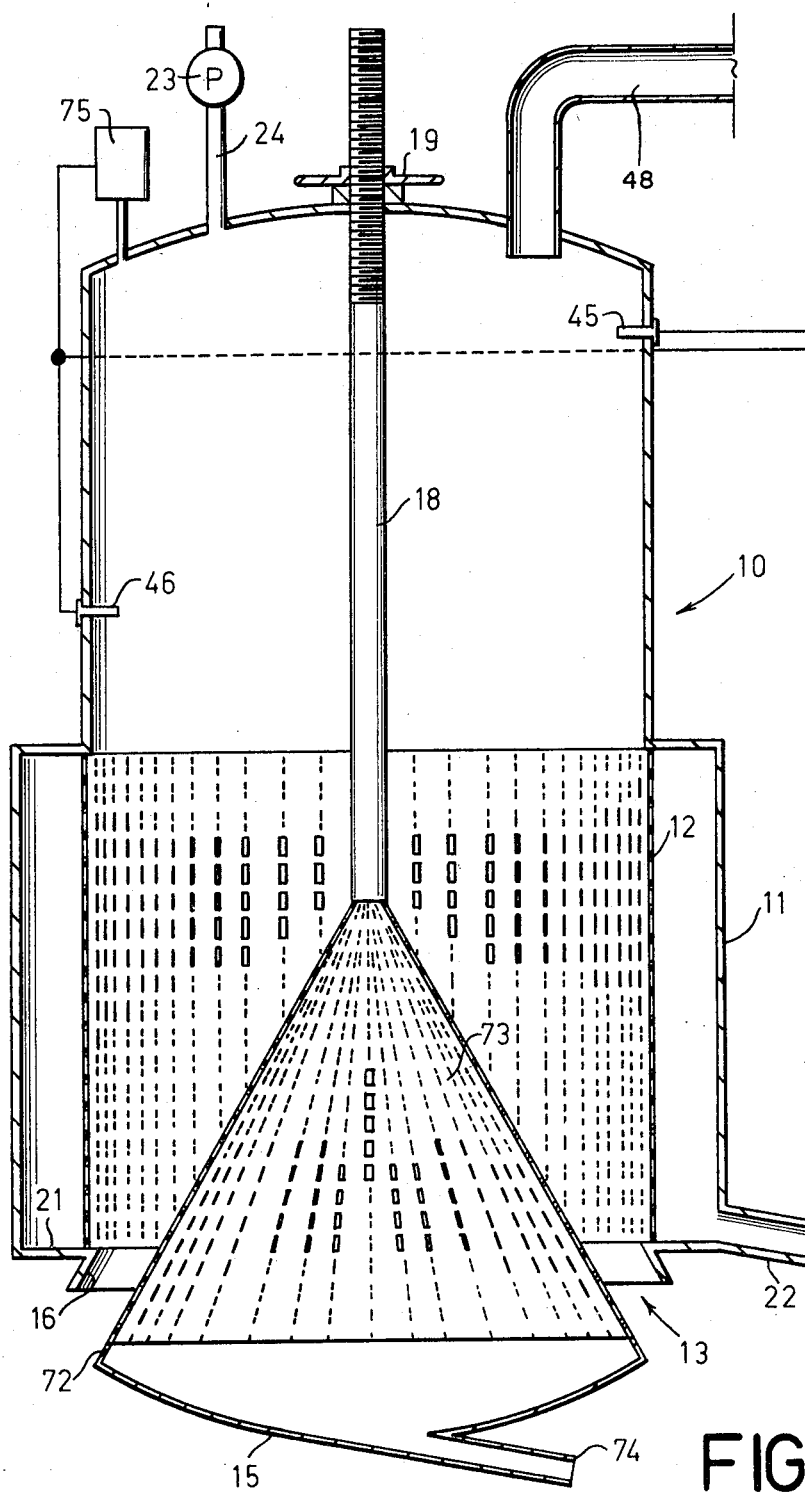
Figure 4:
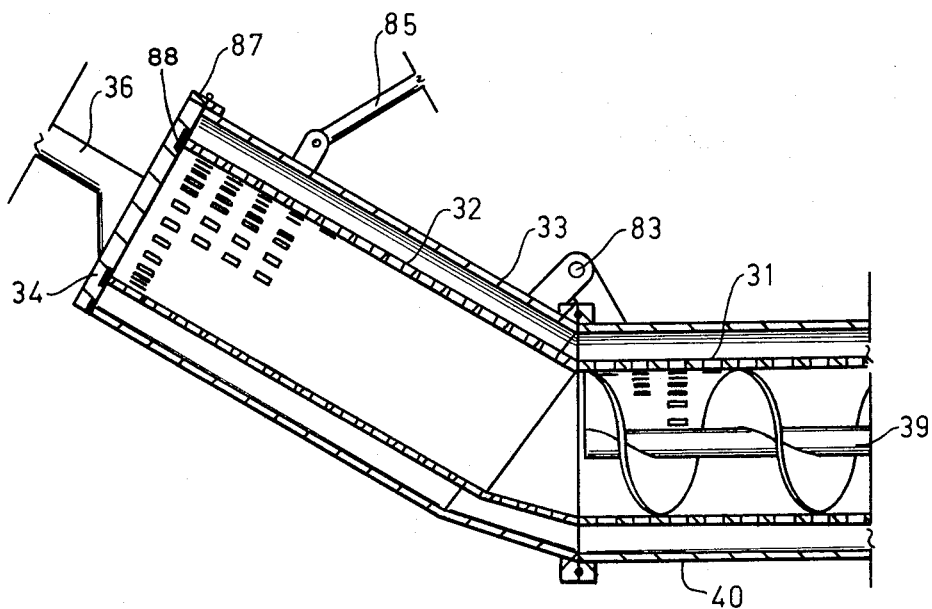
Figure 5:
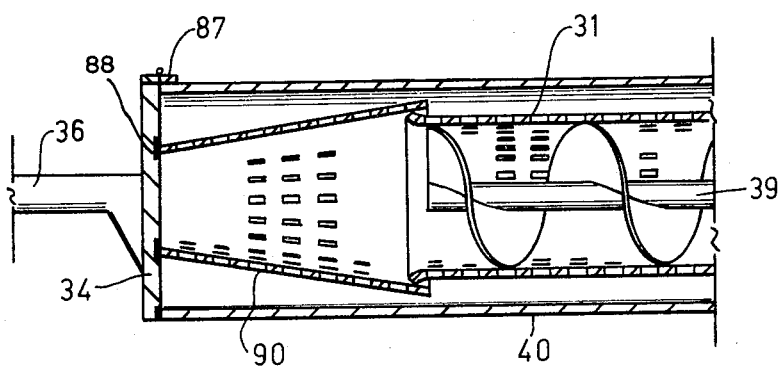

An embodiment of the invention is described hereunder in further detail with reference to and is illustrated in the accompanying drawings, in which:

FIG. 1 is a diagrammatic representation of a juice extracting device which includes means for continuous operation and means to reduce oxidation of the crushed fruit, FIG. 2 illustrates to an enlarged scale a device for extracting juice which is illustrated diagrammatically in FIG. 1, FIG. 3 illustrates also to an enlarged scale the primary extraction container which is illustrated diagrammatically in FIG. 1, and FIG. 4 illustrates also to an enlarged scale the perforate conduit shown in FIGS. 1 and 2, which is variable for direction, and FIG. 5 illustrates to a similarly enlarged scale an alternative arrangement wherein the perforate conduit is variable, not in direction, but in diameter.

Referring generally to FIG. 1, a juice extracting device for extracting juice from crushed fruits comprises a container 10 with an outer imperforate wall 11 and an inner perforate wall 12, a discharge opening 13 in the container, the perforate wall 12 defining conduit means leading to the discharge opening 13, the discharge opening 13 being formed between a closure member 15 and a seat 16 in the base of the imperforate wall 11, the closure member 15 being provided with an upstanding screw threaded stem 18 fitted with a hand wheel 19 which is operable to open or close the discharge opening 13, so that in practice the size of the opening 13 constitutes flow restriction means, and may be adjusted.

The lower end of the outer imperforate wall 11 terminates in an inwardly directed flange 21 which co-operates with the wall 11 to form collecting means for juice which drains from crushed fruit when in the container 10, and the collecting means is provided with an outlet spout 22.

The container 10 is provided with a pump 23 in a gas line 24 arranged to introduce gas which is not oxygen rich (in this embodiment carbon dioxide) into the container 10 so as to constitute pressure exerting means.

The container 10 constitutes means for removal of most of the juice from epidermal cells. However, the cells which pass through the opening 13 also contain a considerable amount of valuable juice, and are discharged into the secondary container 27 formed by imperforate side walls 28 and having an open top 29. The lower portion of the secondary container 27 contains a trough 30 of perforate material which extends into a circular section conduit 31 discharging into an upwardly angled conduit 32 in a hinged extension tube 33, the conduits 31 and 32 also being of perforate material. The upper end of the upwardly angled conduit 32 is provided with a hinged counterweighted door 34, a weight 35 on an arm 36 tending to retain the door closed so as to constitute flow restriction means at the locality of the discharge opening closed by the door. A driven auger 39 functions as pressure exerting means to firstly drive crushed fruit through the trough 30 and then through the conduits 31 and 32. A hinged extension tube co-operates with the imperforate base 40 of the secondary container 27 to form collecting means for juice which is then discharged through a spout 41.

Still referring in general to FIG. 1, a crusher pump 44 is controlled by a level switch 45 in the container 10 so that when the level rises to the height of the level switch 45 the crusher pump 44 ceases to operate. It recommences operation when a lower level switch 46 senses drop in level of crushed fruit in the container 10. The crusher pump 44 crushes and drives fruit delivered through an inlet tube 48 into the container 10.

From the above description it will be seen that this embodiment contains two portions of the juice extracting device which, while constituting a single juice extracting device in combination, may nevertheless be considered separately. The first portion is constituted by the container 10 together with its ancillary equipment which provides a continuous pressure exerting device on the crushed fruit so that most of the juice can be extracted therein, while the second element is constituted by the secondary container 27 and its relatively high pressure juice extracting mechanism.

These elements are referred to in some further detail hereunder;

The pressure imparting device and the container 10 can be seen from FIG. 3. The seat 16 is a conical seat which is abutted by a complementary surface 72 on a flange surrounding the closure member 15. The closure member 15 is provided with upstanding conical slatted sides 73 forming a perforate wall so that the crushed fruit is forced into a continuously reducing cross-sectioned conduit between the inner perforate wall 12 and the slatted sides 73, thereby forcing some of the juice into the closure member 15 to be delivered from the spout 74 thereon.

When the container 10 is first filled with the crushed mass the juice draining off will contain a large amount of sediment or lees.

Filling of the container continues until the crushed grapes start entering the cylindrical section. At this point the gas under pressure is introduced into the device by pump 23 through the gas line 24. Filling of the container continues and as the level of the crushed grapes rises inside the cylindrical section the pressure of the gas increases. This causes the gas to percolate through the crushed grapes until it reaches the liquid level thus exerting pressure on the liquid and expelling it through the openings in the perforated sections.

This increase in gas pressure has three effects:

1. It increases the back-pressure in conduit 48.
2. The gas under pressure forces the juice through the solids contained in the device and in doing so the juice leaches out the color which has been released from the skins.
3. The gas pressure acts on the drained solids in the perforated conical section thus expelling the liquid contained in the solids, and then expels the solids through discharge opening 13.

The upper end of the container 10 is also provided with a relief valve 75 which is arranged to relieve pressure of carbon dioxide within the container 10. The carbon dioxide may be conveniently supplied from fermentation if the device is used in a wine making process. The level switch 46 is coupled to the relief valve 75 as well as to the crusher pump 44 so that the pressure of gas is reduced upon operation of the switch 46, providing means for avoiding build-up of excessive pressure within the container 10 as it is recharged with crushed fruit.

FIGS. 2 and 4 illustrate further details of the secondary container 27 which is employed to extract further juice from the epidermal cells which pass outwardly through the discharge opening 13 of the container 10.

A gearbox 78 has journalled in it a driving shaft 79 having thereon a worm which drives a worm gear 80 on one end of the shaft 81 which supports the auger 39.

A hinge 83 interconnects the extension tube 33 with a tubular extension 84 of the base 40, while a jack member 85 retains the hinged extension tube 33 in the position shown but enables it to be lifted for cleaning purposes.

A further hinge 87 supports the weighted door 34, the door 34 containing a gasket 88 which seats against the end of the upwardly angled perforate conduit 32. The combination of the upwardly sloping conduit 32 and the weighted door 34 enables very considerable pressure to be brought against the epidermal cells as they pass outwardly to discharge, while the auger 39 imparts the pressure. However, the skins in negotiating the "lobster back" portion of the upwardly angled conduit 32 tend to "open out" except at the top, to be again subject to pressure as they approach the door 34. This release and re-application of pressure provides the unexpected result of releasing further juice from the epidermal cells.

While the arrangement of FIG. 4 is preferred to that of FIG. 5, nevertheless the employment of the perforate conical extension tube 90 provides means whereby the pressure on the epidermal cells is released and re-applied, since the mouth of the extension tube 90 is of greater diameter than the conduit 31, but the discharge end is of diameter less than that of the mouth.

It will be appreciated that the counterweight arrangement, or the hand operated door arrangement, can be replaced by respective hydraulically operated means. Further, the carbon dioxide can be replaced by or used in conjunction with nitrogen or other relatively inactive gas.

It is found with this invention that not only does the color leach from the grapes, but also some of the flavor characteristics which are thereby retained.

What we claim is:

1. A device for extracting juice from crushed fruit comprising a frame, an auger journalled in the frame, drive means coupled to the auger, a perforate member beneath the auger, a perforate conduit constituting an extension of the perforate member, imperforate juice collecting means beneath both the perforate member and the perforate conduit, a discharge opening in the perforate conduit, flow restriction means in the discharge opening, the perforate conduit varying in direction to include an upwardly angled portion so constructed and arranged as to firstly reduce and then reapply pressure on the epidermal cells when they are driven through the perforate conduit, and an upwardly angled imperforate extension tube enclosing the upwardly angled portion.

2. A device for extracting juice according to claim 1 wherein the perforate member is a trough shaped member.

3. A device for extracting juice according to claim 1 further comprising hinge means hinging the upwardly angled extension tube to the frame, and a screw threaded jack coupled to the upwardly angled extension tube and to the frame and arranged to position the extension tube either in alignment with, or retracted from, the imperforate juice collecting means, and at the same time position the upwardly angled perforate conduit portion respectively in communication with or retracted from said perforate conduit extension.

4. A device for extracting juice according to claim 1 wherein the perforate conduit comprises two tubes arranged in tandem, the first tube having a constant diameter and second tube being frusto-conical in shape and arranged to have the entry end of greater diameter than the first tube and the discharge end of diameter less than the diameter of the entry end.

5. A device for extracting juice according to claim 1 wherein the flow restriction means comprises a door, hinge means joining the door to the frame whereby the door may be closed over the discharge opening, an arm extending outwardly from the door, and a weight on the arm urging the door towards a closed position.

* * * * *